United States Patent

Wiss

[11] Patent Number: 5,816,666
[45] Date of Patent: Oct. 6, 1998

[54] PROCESS AND APPARATUS FOR CONTROLLING THE BRAKE SYSTEM OF A VEHICLE

[75] Inventor: Helmut Wiss, Moeglingen, Germany

[73] Assignee: Robert Bosch GmbH, Stuttgart, Germany

[21] Appl. No.: 663,677

[22] Filed: Jun. 14, 1996

[30] Foreign Application Priority Data

Jul. 21, 1995 [DE] Germany .................. 195 26 659.5

[51] Int. Cl.$^6$ .................................................. B60T 8/34
[52] U.S. Cl. .................. 303/113.4; 303/155; 303/189
[58] Field of Search .................. 303/113.4, 189, 303/155, 157, 158

[56] References Cited

U.S. PATENT DOCUMENTS

| | | | |
|---|---|---|---|
| 5,158,343 | 10/1992 | Reichelt et al. | 303/113.4 |
| 5,230,549 | 7/1993 | Osada et al. | 303/113.4 X |
| 5,375,917 | 12/1994 | Inagaki et al. | 303/113.4 X |
| 5,558,409 | 9/1996 | Walenty et al. | 303/113.4 X |
| 5,564,797 | 10/1996 | Steiner et al. | 303/113.4 |

FOREIGN PATENT DOCUMENTS

| | | |
|---|---|---|
| 4102496 | of 1992 | Germany . |
| 4028290 | 1/1992 | Germany ............. 303/113.4 |
| 19501760 | of 1996 | Germany . |
| 1465613 | of 1977 | United Kingdom . |
| 2053394 | of 1981 | United Kingdom . |
| 2127505 | of 1984 | United Kingdom . |
| 2282649 | of 1995 | United Kingdom . |

*Primary Examiner*—Peter M. Poon
*Attorney, Agent, or Firm*—Felfe & Lynch

[57] ABSTRACT

A process and an apparatus are provided for controlling the brake system of a vehicle. A desired value representing the vehicle deceleration is formed depending on a depression signal derived from actuation of the brake pedal by the drive, and additionally depending on the rate of change that signal. The actual vehicle deceleration is compared to the desired value and the vehicle is automatically braked when the actual deceleration deviates from the desired value.

18 Claims, 1 Drawing Sheet

PROCESS AND APPARATUS FOR CONTROLLING THE BRAKE SYSTEM OF A VEHICLE

BACKGROUND OF THE INVENTION

The invention pertains to a process and to a device for controlling the brake system of a vehicle.

A process and a device for controlling the brake system of a vehicle are known from nonprepublished German Patent Application No. 1 95 01 760.9 of Jan. 21, 1995, in which, as a function of the actuation of the brake pedal by the driver, the braking force in the wheel brakes is actively increased during a braking operation by the actuation of the return pump(s), one or more switching valves, and/or one or more suction valves. The braking force is increased in this case beyond the value predetermined by the design of the brake system and corresponding to the associated command of the driver. The increase in the braking force takes place under operating conditions which are characterized by a rapid and forceful actuation of the brake pedal by the driver in response to a dangerous situation. For this reason, at least the actuation speed or rate of change in the pressure in the area of the master brake cylinder is compared with a predefined threshold value; if the threshold is exceeded, the automatic braking operation described above is initiated. The automatic braking operation is ended when at least the degree of actuation of the pedal or the pressure in the master brake cylinder falls below another predefined threshold value. With this known procedure, the pressure is built up until the brake antilock control system responds. The driver thus has no influence on the deceleration of the vehicle.

Because it has been found that the driver should have influence on the deceleration of the vehicle under all operating conditions, it is the task of the present invention to provide suitable measures for accomplishing this goal.

SUMMARY OF THE INVENTION

As a result of the measures taken in accordance with the invention, the driver has influence on the deceleration of the vehicle in all operating situations, including those situations which involve automatic braking.

It is especially advantageous that the deceleration of the vehicle is adjusted as a function of the force exerted by the driver's foot. For a given amount of force exerted by the foot the vehicle is always decelerated to the same corresponding degree, regardless of the vehicle weight and regardless of the condition of the brakes.

It is especially advantageous that, in addition to the force exerted by the foot, the change in this force is also taken into consideration. Thus the driver can cause the vehicle to be decelerated even more quickly by bring about a faster change in the force exerted by his foot. This therefore has the effect of: increasing driving safety in situations involving braking to a full stop.

It is especially advantageous that the driving behavior of the vehicle is improved by the distribution of the braking moments over the individual wheel brakes. In this way, the rear axle brake system is able to make a larger contribution to the deceleration of the vehicle.

BRIEF DESCRIPTION OF THE DRAWING

The sole figure shows an overall block circuit diagram of the measures according to the invention, which are implemented in a preferred embodiment as a computer program running on a microcomputer.

DETAILED DESCRIPTION OF THE PREFERRED EMBODIMENT

Figure 1:
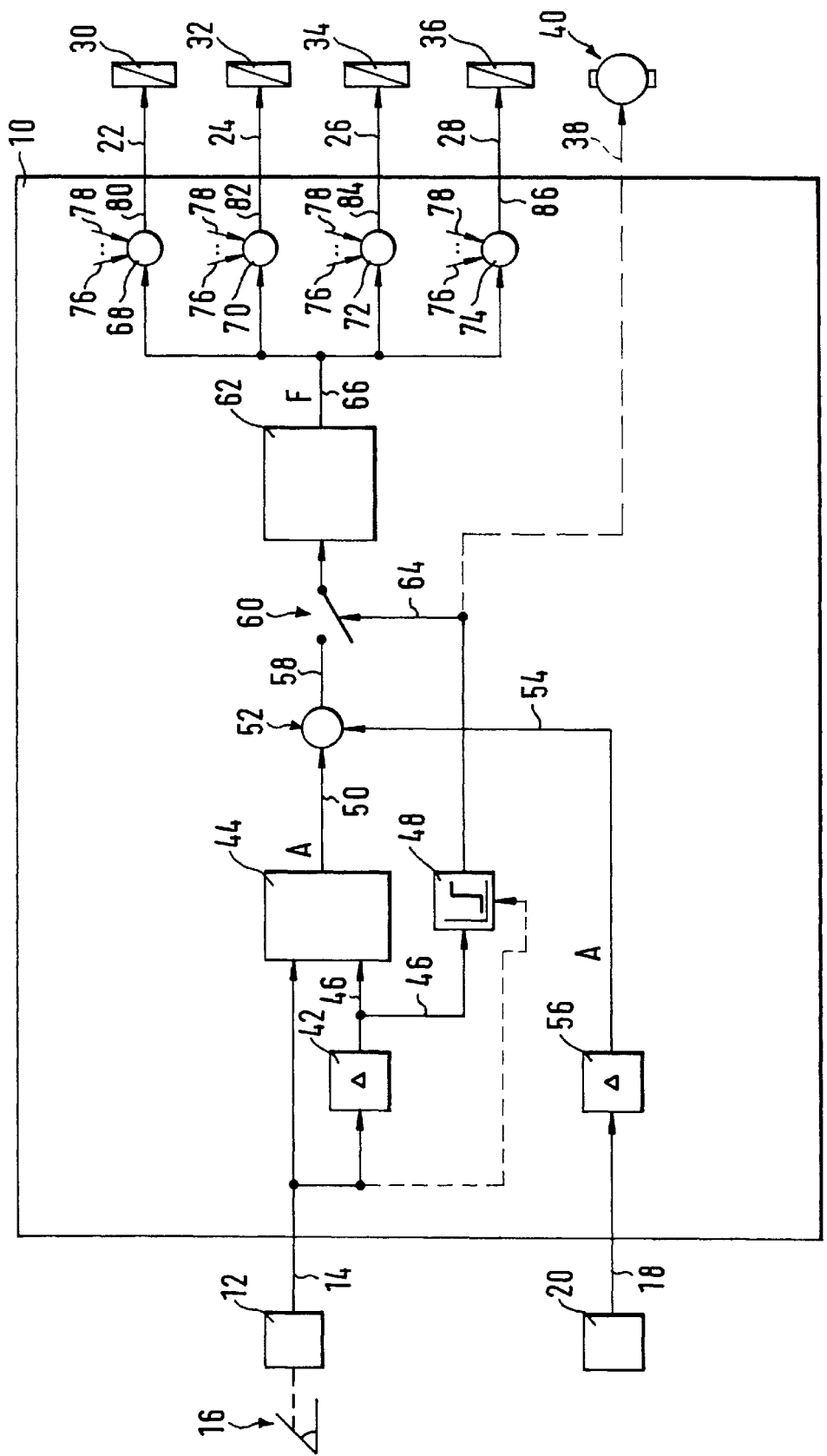

The Figure shows a control unit 10, which, in the preferred exemplary embodiment, comprises at least one microcomputer. This microcomputer implements the process according to the invention, which is illustrated on the basis of a block circuit diagram.

An input line 14 leads from a measuring device 12 to a control unit 10 and thus to the microcomputer. This line supplies control unit 10 with a signal representing the driver's command to actuate brake pedal 16. In the preferred exemplary embodiment, this actuation signal value represents the input pressure $P_{vor}$ in the master brake cylinder of the brake system. In other advantageous exemplary embodiments, the value can be a pressure in the brake line(s) of the brake system or a signal value for the actuation force or actuation distance of the brake pedal. An input line 18 from a device 20, which determines the velocity of the vehicle, also leads to control unit 10. The velocity is determined by a separate measuring device or, in a preferred exemplary embodiment, on the basis of the velocities of the wheels of the vehicle.

Control unit 10 controls valve assemblies 30, 32, 34, and 36 by way of output lines 22, 24, 26, and 28. These valves control the braking force at the wheels by actuating the wheel brake cylinders (or calipers). In addition, an output line 38 is provided in the preferred exemplary embodiment, which drives at least one return pump 40, which actively builds up the braking force.

Input line 14 from measuring device 12 leads to a differentiator 42 and to a desired value former 44. Output line 46 of differentiator 42 leads to desired value former 44 and to a threshold stage 48. To change the predetermined threshold value, at least the actuating signal (see the dashed signal line) is sent to the threshold stage 48. Output line 50 of desired value former 44 leads to a comparison stage 52, to which a line 54 from a second differentiator 56 is also connected. An input line 18 for the vehicle velocity is connected to this second differentiator.

Output line 58 of comparison stage 52 leads by way of a switching element 60 to a controller 62. Switching element 60 is actuated by way of line 64, which is the output line of threshold stage 48. Output line 38 branches off from line 64.

Output line 66 of controller 62 leads to correction units 68, 70, 72, 74, which are assigned to the individual wheel brakes. Signal values are sent via lines 76–78 to these units to correct the individual braking forces to be applied to the individual wheels. Wheel-specific values of this type include the size of the wheels, the wheel loads, the coefficients of friction, information on whether the vehicle is driving around a curve, etc. Output lines 80, 82, 84, 86 lead preferably by way of braking moment controllers (not shown) to output lines 22, 24, 26, 28 of control unit 10.

The basic idea of the measures according to the invention is that a desired deceleration of the vehicle $A_{soll}$ is calculated on the basis of the actuation signal and its change. From the difference between the desired acceleration value $A_{soll}$ and the actual deceleration $A_{ist}$ of the vehicle, a vehicle-specific braking force is determined. As a function of the driving conditions, which are described by the wheel loads, the coefficients of friction, curve detection, etc., a wheel-specific distribution of the braking moment is carried out, which is produced by way of appropriate controller units at the individual wheel brakes.

To implement this basic idea, an equation, a table, or characteristic field is stored in desired value former 44, by means of which a desired deceleration $A_{soll}$ of the vehicle is assigned to the actuation signal and its change. In the preferred exemplary embodiment, the pressure in the master brake cylinder of the brake system, i.e., the so-called input pressure, is detected and used as the actuation signal. This signal is sent via line 14 to desired value former 44. In addition, this signal is differentiated in differentiator 42, so that the rate of change in the input pressure can be sent via line 46 to desired value former 44. There, with the help of predetermined constants K1 and K2, the desired deceleration is determined from the input pressure $P_{vor}$ and the input pressure gradient $dP_{vor}/dt$ by means of the following vector equation:

$$A_{Soll} = \begin{bmatrix} K1 \\ K2 \end{bmatrix} * \begin{bmatrix} P_{vor} \\ dP_{vor}/dt \end{bmatrix}$$

In another embodiment a characteristic field is provided in the desired value former 44, which field is a store of desired values which are selected in dependence upon the input values. The values of the constants $K_1$ and $K_2$ in one embodiment and the characteristic field in the other embodiment must be determined experimentally for each type of car. The values depend on the desired behavior of the car during braking. Generally speaking the desired acceleration increases when the actuation signal increases and the rate of change of the actuation signal increases. If it is desired for a substantial braking effect to take place earlier, the increase of the desired acceleration in a lower range of the actuation signal (and the rate of change of this value) in dependence on the input signals, will be greater than in an embodiment where it is desired for the braking effect to take place later (for example the middle of the actuation range of the brake pedal to the end).

In other advantageous embodiments, some other value representing the actuation of the pedal, e.g. the actuation force of the pedal, the actuation distance of the pedal, etc., and the corresponding gradient are used in the same way to calculate the desired value.

As described above, the establishment of the relationship between the desired deceleration $A_{soll}$ and the input signals is carried out on the basis of experiment and also under consideration of predefined boundary conditions, which define the basic relationship between the force exerted by the driver's foot and the deceleration of the vehicle. In comparison stage 52, the difference between the desired deceleration $A_{soll}$ and the actual deceleration $A_{ist}$ is found. The latter value is determined by the calculation of the gradient of the vehicle velocity signal in differentiator 56. The difference between the desired and the actual deceleration is sent to controller 62. This determines the braking force F relative to the vehicle, i.e., the force which is to be arrived to make the actual deceleration equal to the desired deceleration. The determination is carried out as a function of the difference between the two values under consideration of a predefined control strategy (e.g., PID).

To improve the driving behavior and possibly to improve the braking action of small rear axle brakes, the vehicle-specific braking force F is corrected in correction units 68, 70, 72, 74 on a wheel-specific basis. That is, a wheel-specific braking moment is determined on the basis of the braking force F which has been determined; this braking moment is calculated by multiplying the determined braking force F by the wheel radius $R_{Rad}$ and by a factor f, which is as a function of the driving conditions. This factor takes into account the wheel load, the coefficient of friction, and/or the conditions of driving around a curve. The wheel-specific braking moments are produced by the controlled actuation of valve assemblies 30, 32, 34, 36, preferably as part of a braking moment control system.

The brake system in the preferred exemplary embodiment is a hydraulic brake system. Corresponding measures, however, can also be implemented in a pneumatic, an electro-hydraulic, electro-pneumatic, or purely electric brake system.

In the preferred exemplary embodiment, the deceleration control process is carried out during the operating state of panic braking. Panic braking is an operating state in which the driver, as the result of a dangerous situation, actuates the brake pedal suddenly, with great speed and great force. To identify this braking situation, the gradient of the brake pedal actuation, preferably under consideration of the actuation signal itself, is compared with a predefined threshold value. If the gradient exceeds this threshold value, as determined in threshold stage 48, braking force is built up in the wheels beyond that specified by the driver, by sending a signal via line 38 to drive the return pump 40 and control inlet and exhaust valves as necessary. At the same time, a signal is sent over line 64 to close switch 60, so that the procedure according to the invention can be carried out from the beginning to the end of the panic braking situation. The end of the panic braking situation is recognized when the actuation signal falls below a predefined threshold.

In another exemplary embodiment, the braking force is increased not only in a panic braking situation but also continuously as part of a power-assisted braking system as a function of the actuation gradients of the brake pedal. The faster the pedal is actuated, the greater the braking force produced at the wheels. Under the conditions in which the braking force is increased beyond the value associated with the driver's command, the measures according to the invention are implemented in this type of function as well.

What is claimed is:

1. Process for controlling the brake system of a vehicle having a brake pedal adapted to be actuated by a driver, said process comprising:

generating an actuation signal representing the depression of the brake pedal by the driver;

determining the rate of change of said actuation signal, determining a desired value representing vehicle deceleration as a function of said actuation signal and said rate of change of said actuation signal;

determining the actual vehicle deceleration, comparing said actual vehicle deceleration to said desired value, and responsive to a determination that said actual vehicle deceleration deviates from said desired value, automatically braking said vehicle so that said actual vehicle deceleration tends toward said desired vehicle deceleration values.

2. Process according to claim 1, wherein the actuation signal is determined from one of the pressure in the master brake cylinder of the brake system, the actuation distance of the brake pedal, the actuating force of the brake pedal, and the pressure in a brake line of the brake system.

3. Process according to claim 1 wherein a controller is provided which determines an amount of braking force required to produce the desired deceleration as a function of the deviation between the actual deceleration and the deceleration value.

4. Process according to claim 1 wherein individual wheel brakes associated with the brake system are controlled in such a way as to produce the deceleration under consideration of wheel-specific braking moment distribution.

5. Process according to claim 1 wherein the brake system is one of a hydraulic, pneumatic, electric, electro-hydraulic, or electro-pneumatic brake system.

6. Process according to claim 1 wherein the deceleration control is implemented during panic braking.

7. Process according to claim 6 wherein, during panic braking, a braking force exceeding that specified by the driver is produced at the wheel brakes so as to produce the desired deceleration during said panic braking.

8. Process according to claim 1 wherein the desired deceleration is specified in such a way that, for the same pedal force, the same actual vehicle deceleration is always produced regardless of vehicle weight and condition of the brakes.

9. Process for controlling the brake system of a vehicle having a brake pedal adapted to be adapted by a driver, said process comprising:

generating an actuation signal representing the depression of the brake pedal by driver;

determining the rate of change of said actuation signal;

determining a desired value representing vehicle deceleration as a function of said actuation signal and said rate of change of said actuation signal;

determining the actual vehicle deceleration;

comparing said actual vehicle deceleration to said desired value;

responsive to a determination that said actual vehicle deceleration deviates from said desired value, automatically braking said vehicle so that said actual vehicle deceleration tends toward said desired vehicle deceleration value;

wherein the brake system generates a braking moment which is distributed on a wheel-specific basis through consideration of values which characterize the driving conditions selected from the group consisting of wheel loads, coefficients of friction, conditions of driving around a curve, and the radii of the wheels.

10. Apparatus for controlling the brake system of a vehicle having a brake pedal adapted to be actuated by a driver, said apparatus comprising:

means for generating an actuation signal representing depression of the brake pedal by the driver;

means for determining a rate of change of said actuation signal;

means for determining a desired value representing the desired vehicle deceleration depending on both said actuation signal and said rate of change of said actuation signal;

means for determining actual deceleration of the vehicle;

means for comparing said actual vehicle deceleration to said desired value and determining when said actual vehicle deceleration deviates from said desired value; and means for automatically braking said vehicle so that the actual vehicle deceleration tends toward said desired vehicle deceleration value responsive to a determination that said actual deceleration deviates from the desired value.

11. Apparatus according to claim 10, wherein the actuation signal is determined from one of the pressure in the master brake cylinder of the brake system, the actuation distance of the brake pedal, the actuating force of the brake pedal, and the pressure in a brake line of the brake system.

12. Apparatus according to claim 10, further comprising a controller determining an amount of braking force required to produce the desired deceleration as a function of the deviation between the actual deceleration and the desired deceleration value.

13. Apparatus according to claim 10 wherein the brake system includes individual wheel brakes which are controlled in such a way as to produce the desired deceleration under consideration of a wheel-specific braking moment distribution.

14. Apparatus according to claim 10 wherein the brake system is a hydraulic, pneumatic, electric, electro-hydraulic, or electro-pneumatic brake system.

15. Apparatus according to claim 10 wherein the means for automatic braking is activated responsive to a detection of panic braking.

16. Apparatus according to claim 15 wherein, during said panic braking, a braking force exceeding that specified by the driver is produced at the wheel brakes so as to achieve the desired deceleration during said panic braking.

17. Apparatus according to claim 10 wherein the desired deceleration is specified in such a way that, for the same pedal force, the same actual vehicle deceleration is always produced regardless of vehicle weight and condition of the brakes.

18. Apparatus for controlling the brake system of a vehicle having a brake pedal adapted to be actuated by a driver, said apparatus comprising:

means for generating an actuation signal representing depression of the brake pedal by the driver;

means for determining a rate of change of said actuation signal;

means for determining a desired value representing the desired vehicle deceleration depending on both said actuation signal and said rate of change of said actuation signal;

means for determining actual deceleration of the vehicle;

means for comparing said actual vehicle deceleration to said desired value and determining when said actual vehicle deceleration deviates from said desired value; and means for automatically braking said vehicle so that the actual vehicle deceleration tends toward said desired vehicle deceleration value responsive to a determination that said actual deceleration deviates from the desired value;

wherein the brake system generates a braking moment which is distributed on a wheel-specific basis through consideration of values which characterize the driving conditions selected from the group consisting of wheel loads, coefficients of friction, conditions of driving around a curve, and the radii of the wheels.

* * * * *

UNITED STATES PATENT AND TRADEMARK OFFICE
CERTIFICATE OF CORRECTION

PATENT NO. : 5,816,666
DATED : October 6, 1998
INVENTOR(S) : Helmut WISS

It is certified that error appears in the above-indentified patent and that said Letters Patent is hereby corrected as shown below:

column 1, line 55, before "increasing" delete -- : --.

Claim 1, column 4, line 54, change "values" to -- value --.

Signed and Sealed this

Nineteenth Day of October, 1999

Attest:

Q. TODD DICKINSON

*Attesting Officer*  *Acting Commissioner of Patents and Trademarks*